United States Patent

Okada et al.

[11] Patent Number: 6,067,798
[45] Date of Patent: May 30, 2000

[54] TURBOCHARGER CONTROL APPARATUS AND A CONTROL METHOD OF TURBOCHARGER WITH A VARIABLE NOZZLE

[75] Inventors: Seiji Okada, Kawasaki; Takashi Takahashi, Tokyo, both of Japan

[73] Assignee: Mitsubishi Jidosha Kogyo Kabushiki Kaisha, Tokyo, Japan

[21] Appl. No.: 09/050,430

[22] Filed: Mar. 31, 1998

[30] Foreign Application Priority Data

Apr. 2, 1997 [JP] Japan .................................. 9-083866

[51] Int. Cl.[7] .................................................. F02D 23/00
[52] U.S. Cl. ................................................................ 60/602
[58] Field of Search .................................... 60/600, 602

[56] References Cited

U.S. PATENT DOCUMENTS 4,292,806  10/1981  Moore et al. ............................ 60/600

FOREIGN PATENT DOCUMENTS 4-33384 Y2  8/1992  Japan .

Primary Examiner—Noah P. Kamen

[57] ABSTRACT

A turbocharger control apparatus has an exhaust turbine including an exhaust gas introducing port having a variable nozzle which can vary a passage area of the port by adjusting its opening degree, an engine load detection device which detects a load of an internal combustion engine, an idling state detection device which detects an idling state of the engine, and a control device which adjusts the opening degree of the nozzle in a region equal to or greater than a predetermined opening degree when the load detection device detects the engine load, and which adjusts the opening degree of the nozzle in a region smaller than the predetermined opening degree when the load detection device detects the non-engine load and detects that the internal engine is in the idling state. A control method of a turbocharger with a variable nozzle, has a step which detects an idling state and a load state of an internal combustion engine, and a step which adjusts an opening degree of the nozzle in a region equal to or greater than a predetermined opening degree when the load state of the engine is detected, and which adjust the opening degree of the nozzle in a region smaller than the predetermined opening degree when the idling state and the non-load state of the engine is detected.

7 Claims, 3 Drawing Sheets

TURBOCHARGER CONTROL APPARATUS AND A CONTROL METHOD OF TURBOCHARGER WITH A VARIABLE NOZZLE

BACKGROUND OF THE INVENTION

The present invention relates to a turbocharger control apparatus and a control method of a turbocharger with a variable nozzle, both for variably controlling an entry port area of an exhaust turbine of the turbocharger so as to enhance warm-up performance of an internal combustion engine.

In a truck in which a diesel engine is mounted, in order to warm up the engine quickly after a start of the engine, a butterfly valve of an exhaust brake apparatus provided in an exhaust pipe of the engine is closed when an accelerator is off (the accelerator is positioned at its initial position) and the engine is idling.

This is because that if the butterfly valve of the exhaust brake apparatus is closed, an exhaust resistance of the engine is increased to increase a load of the engine, so that an amount of the fuel injected to each of cylinders of the diesel engine is increased (so as to keep an idling engine speed constant) and an engine speed for warming up the engine becomes faster.

However, this causes problems that black smoke is generated easily due to a shortage of intake air to be drawn by the diesel engine, and that a noise is generated when the exhaust gas passes through a narrow gap between a periphery of the fully closed butterfly valve and an inner surface of the exhaust pipe.

Thereupon, in order to quicken the warm-up of the engine it has been proposed to use a turbocharger provided at its exhaust gas introducing port with a variable nozzle (It varies the area of an exhaust gas introducing port in accordance with an operation state of the engine.) for supercharging the engine from its low speed.

By this proposal, the exhaust resistance in the exhaust pipe is increased (an exhaust gas pressure is increased) with the variable nozzle of the turbocharger at the time of idling of the engine, as in the above mentioned case that uses the exhaust brake apparatus.

More specifically, as disclosed in Jpn. Utility Model Appln. KOKAI Publication No. 4-33384, when an engine temperature is equal to or less than a predetermined temperature (a border temperature between a cold engine and a hot engine), e.g., 20° C. or less, and the engine is in a light load state, the narrowest nozzle opening degree is selected among a plurality of nozzle opening degrees of the variable nozzle which are normally used when an automobile (vehicle) is running, and otherwise, one of the other nozzle opening degrees is selected in accordance with the operational state of the engine.

In the meantime, it is required to complete the warm-up of the engine as soon as possible so that the automobile can start as soon as possible.

However, the plurality of nozzle opening degrees of the variable nozzle which are normally used when the automobile runs are so set that an appropriate boost pressure can be obtained at any engine speed, i.e., a low engine speed state, an intermediate engine speed state and a high engine speed state, so that the turbocharger can supercharge the engine appropriately in accordance with the running state of the automobile.

As described above, since the plurality of nozzle opening degrees do not include a nozzle opening degree suitable for an extremely low engine speed state such as an idling state, even if the variable nozzle is set at the narrowest nozzle opening degree, a sufficient engine warm-up quickening effect can not be obtained.

That is, the narrowest nozzle opening degree of the conventional variable nozzle set at the time of the warm-up generates a flow rate of the exhaust gas which is most suitable for the low engine speed state, but does not generate a flow rate of the exhaust gas which is most suitable for the extremely low engine speed state such as the idling state and therefore, the exhaust resistance (the exhaust gas pressure) in the exhaust pipe is not sufficiently enhanced. Further, the supercharging operation of the turbocharger is insufficient, an intake of air to the cylinder is insufficient, an increase in heat generated by the engine can not be expected, and a sufficient warm-up quickening effect can not be obtained.

A driver or occupant of the truck frequently takes a nap while the engine is idling and a heater is operating. However, since the heat generated by the engine is low at the time of idling as described above, it is difficult to keep a temperature of the coolant of the engine at a predetermine value and sufficient heating performance can not be maintained when the open air temperature is extremely low.

Thereupon, it is proposed to add a nozzle opening degree suitable for the idling engine speed to the plurality of conventional nozzle opening degrees, the newly added nozzle opening degree being smaller than that for the conventional one suitable for the low engine speed.

However, if the nozzle opening degree of such an extremely small value is newly added, although the sufficient warm-up quickening effect can be obtained, the exhaust turbine tends to rotate excessively just after the warm-up of the engine is completed and the automobile starts to run because at this time the nozzle opening degree for the low engine speed state has not set in place of the newly added nozzle opening degree for idling while an accelerator pedal is depressed to bring the engine into a light loaded state and the flow rate of the exhaust gas is increased.

Therefore, although the warm-up of the engine can be quickened, a durability of the turbocharger may be shortened or excessive air may be flown into the cylinder by the excessive rotation of the exhaust turbine to deteriorate a fuel economy of the engine.

BRIEF SUMMARY OF THE INVENTION

The present invention is derived from the above circumstances, and an object of the present invention is to provide a turbocharger control apparatus and a method for controlling a turbocharger with a variable nozzle, both of which can warm-up an engine sufficiently and quickly without shortening a durability of a turbocharger, an excessive rotation of an exhaust turbine of the turbocharger, and deteriorating a supercharging operation mode of the turbocharger which is suitable for a normal operation of the engine.

To achieve the above object, a turbocharger control apparatus according to the present invention comprises: an exhaust turbine including an exhaust gas introducing port into which an exhaust gas is introduced from an exhaust system of an internal combustion engine, the exhaust gas introducing port having a variable nozzle which can vary a passage area of the introducing port by adjusting its opening degree, and the exhaust turbine being driven by an exhaust gas introduced through the introducing port with the variable nozzle; an engine load detection device which detects a load of the internal combustion engine; an idling state detection device which detects an idling state of the internal combustion engine; and a control device which adjusts the opening degree of the variable nozzle in a region equal to or greater than a predetermined opening degree when the engine load detection device detects the load of the engine, and which adjust the opening degree of the variable nozzle in a region smaller than the predetermined opening degree when the engine load detection device detects the non-load of the engine and detects that the internal combustion engine is in the idling state.

In such a turbocharger control apparatus, since the control device adjusts the opening degree of the variable nozzle of the exhaust turbine in the region equal to or greater than the predetermined opening degree when the internal combustion engine is in the loaded state, and further adjusts the opening degree of the variable nozzle in the region smaller than the predetermined opening degree when the internal combustion engine is in the non-loaded state and the internal combustion engine is in the idling state, i.e., at the time of warming-up of the engine, the nozzle opening degree of the variable nozzle of the exhaust turbine can be adjusted to the nozzle opening degree which is suitable for the idling state that is throttled as compared to a case of the normal operating state.

Therefore, it is possible to sufficiently increase the exhaust resistance (the exhaust gas pressure) and to obtain the sufficient intake air, so that a black smoke is not generated and the sufficient warm-up quickening effect can be obtained while the engine is in the idling state. Further, unlike the case in which the butterfly valve of the exhaust brake apparatus is closed, the variable nozzle adjusted for the idling state secures a passage area to such an extent that a large noise is not generated when the exhaust gas passes therethrough.

Further, when the engine speed increases higher than that in the idling state and the engine is applied with the load, the exhaust turbine should not rotate excessively and thus, excessive air should not flow into the cylinders due to the excessive rotation of the exhaust turbine because the nozzle opening degree of the variable nozzle of the exhaust turbine has been changed from the engine warm-up quickening nozzle opening degree less than the predetermined nozzle opening degree to the nozzle opening degree suitable for the normal operation of the engine equal to or larger than the predetermined nozzle opening degree.

In the turbocharger control apparatus according to the present invention, it is preferable that the idling state detection device includes an engine warming-up completion detection unit which detects a completion of the engine warming-up operation, and an engine speed sensor which senses the engine speed; and the idling state detection device detects the idling state when the engine warming-up operation has not yet been completed and the engine speed is equal to or less than the predetermined engine speed, and the control device adjusts the opening degree of the variable nozzle equal to or greater than the predetermined opening degree when the engine speed after the engine worming-up operation is equal to or less than the predetermined engine speed.

In such a turbocharger control apparatus, when the engine warm-up is completed, the nozzle opening degree of the exhaust turbine is changed from the warm-up quickening opening degree to the nozzle opening degree suitable for the normal operation of the engine. Therefore, after the engine warm-up is completed, the exhaust turbine should not rotate excessively and thus, flowing the excessive air into the cylinder due to the excessive rotation of the exhaust turbine should be prevented.

A control method of a turbocharger with a variable nozzle, according to the present invention, comprises: a step which detects an idling state and a load state of an internal combustion engine; and a step which adjusts an opening degree of the variable nozzle in a region equal to or greater than a predetermined opening degree when the load state of the engine is detected, and which adjusts the opening degree of the variable nozzle in a region smaller than the predetermined opening degree when the idling state and the non-load state of the engine is detected.

In the method according to the present invention, it is preferable that the detecting step detects a position of an accelerator, an engine speed, and a coolant temperature; the detecting step further determines the idling state and the non-load state of the engine when the position of the accelerator is an initial position, the engine speed is equal to or less than a predetermined value, and the coolant temperature is equal to or less than a predetermined value; and the detecting step more further determines the load state of the engine when the position of the accelerator is not the initial position, the engine speed is larger than the predetermined value, and the coolant temperature is larger than the predetermined value.

In the method according to the present invention, it is preferable that the engine is mounted on a vehicle; the detecting step further detects a vehicle speed and a position of a shift lever; the detecting step further determines the idling state and the non-load state of the engine when the position of the accelerator is the initial position, the engine speed is equal to or less than a predetermined value, the vehicle speed is zero, the position of the shift lever is a neutral, and the coolant temperature is equal to or less than a predetermined value; and the detecting step more further determines the load state of the engine when the position of the accelerator is not the initial position, the engine speed is larger than the predetermined value, the vehicle speed is not zero, the position of the shift lever is not a neutral, and the coolant temperature is larger than the predetermined value.

In the method according to the present invention, it is preferable that the detecting step further detects an engine brake state, and the adjusting step further adjusts the opening degree of the variable nozzle in the region smaller than the predetermined opening degree when the engine brake state is detected.

In the method according to the present invention, it is preferable that the detecting step further detects a position of an engine brake switch, and determines the engine brake state when the position of the accelerator is an initial position and the engine brake switch is turned on.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
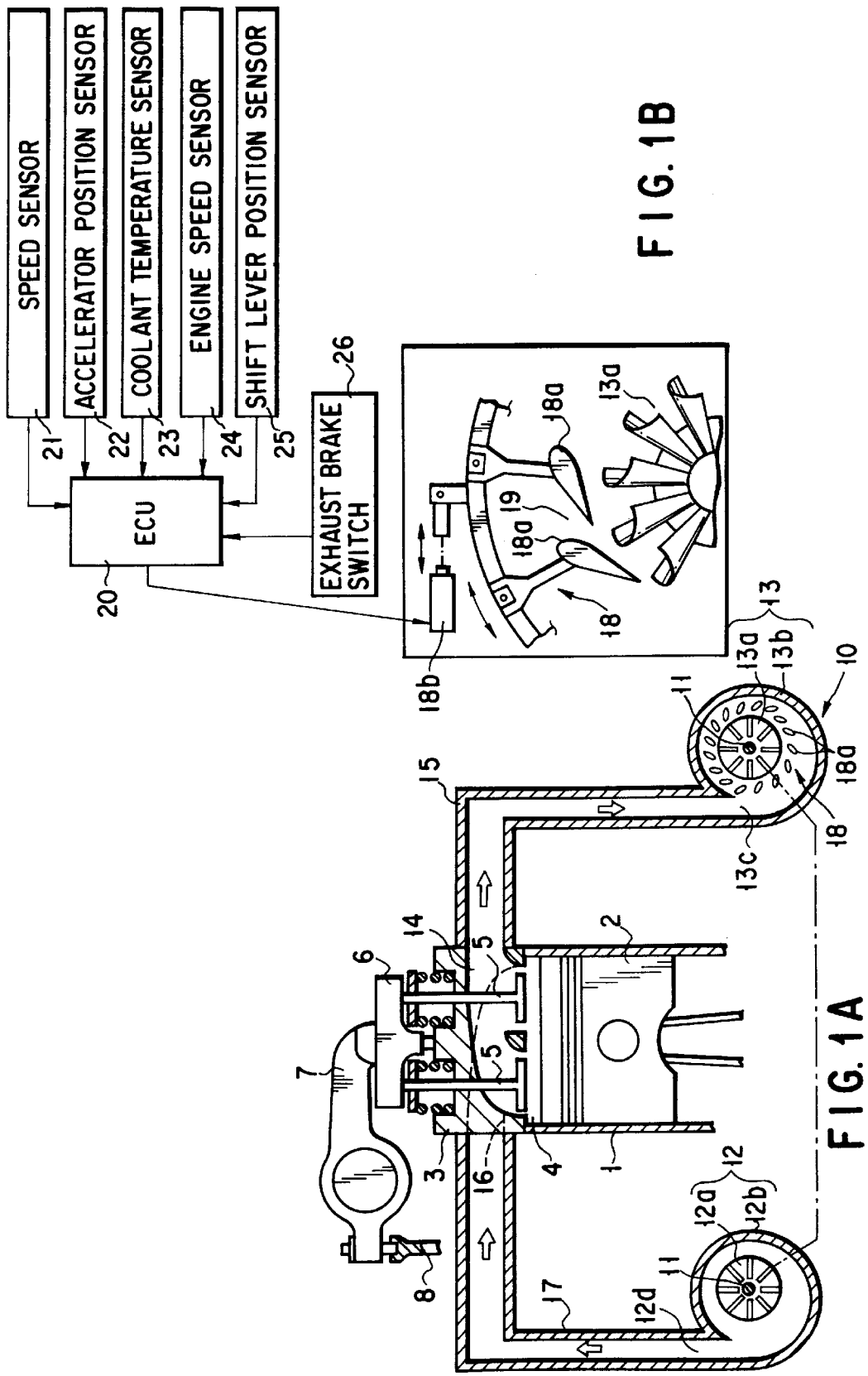
FIG. 1A shows an enlarged schematic sectional view of an essential portion of an engine with a turbocharger to which a turbocharger control apparatus according to an embodiment of the present invention is applied.
FIG. 1B shows an enlarged schematic view of an essential portion of the turbocharger control apparatus of the embodiment of the present invention.

One embodiment of the present invention will be described with reference to FIGS. 1A to 4.

FIG. 1A shows a portion of a high output diesel engine provided with a plurality of cylinders (only one of them is illustrated) and mounted in an automobile such as a truck for example. In FIG. 1A, the reference numeral 1 denotes a cylinder in which a piston 2 is fitted, the reference numeral 3 denotes a cylinder head provided at a head of the cylinder 1, and the reference numeral 4 denotes a combustion chamber.

The cylinder head 3 is provided with a plurality of intake valves (two intake valves are provided on the cylinder head 3 shown in FIG. 1A) which are not shown, a plurality of exhaust valves 5 (two exhaust valves 5 are provided on the cylinder head 3 shown in FIG. 1A), and a fuel injection nozzle (not shown). Each of the intake and exhaust valves are connected to a camshaft (not shown) through, e.g., a valve bridge 6, a rocker arm 7 and a push rod 8, and are opened and closed in accordance with an opening/closing timing and a lift amount set by suction and exhaust cams (both not shown) of the camshaft.

In FIG. 1A, the reference numeral 10 denotes a turbocharger, e.g., a variable geometric turbocharger (which will be referred to as a "VG turbocharger" hereafter). The VG turbocharger 10 includes a compressor wheel 12a and an exhaust turbine wheel 13a, both of which are fixed to opposite ends of a shaft 11, and further includes a compressor housing 12b and a turbine housing 13b for rotatably accommodating these wheels 12a and 13a. A combination of the compressor wheel 12a and the compressor housing 12b constitutes an intake air compressor 12, and a combination of the exhaust turbine wheel 13a and the turbine housing 13b constitutes an exhaust turbine 13.

An exhaust gas introducing port 13c of the turbine housing 13b is connected to an exhaust gas passage 15 constituted by an exhaust manifold extending from an exhaust exit 14 of the cylinder head 3, an exhaust gas pipe and the like. The exhaust turbine wheel 13a is rotated by an energy of an exhaust gas introduced from the exhaust gas introducing port 13c into the turbine housing 13b. An exhaust gas discharging port of the turbine housing 13b is not illustrated.

An intake air introducing port 12d of the compressor housing 12b is connected to an intake passage 17 constituted by an intake manifold extended from an intake port 16 of the cylinder head 3, an intake pipe and the like. Air introduced from an air cleaner (not shown) and an intake air introducing port (not shown) are compressed by the compressor wheel 12a which is driven by the exhaust turbine wheel 13a, and the compressed air is pushed into the combustion chamber 4 through the intake valves (not shown) of the cylinder head 3.

The exhaust gas introducing port 13c of the turbine housing 13b is provided with a variable nozzle 18. The variable nozzle 18 includes a plurality of nozzle vanes 18a which are angularly displaceable, are circularly disposed to surround the turbine wheel 13a and are equidistantly spaced from each other, and a nozzle driving actuator 18b (which is constituted by for example an air cylinder operated by an air pressure from an air tank) which controls an angle of inclination of each of the nozzle vanes 18a as shown in FIG. 1B. A passage area 19 formed between the nozzle vanes 18 can be varied by stepwisely driving the nozzle vanes 18 in a direction to decrease or increase a distance between the plurality of nozzle vanes 18.

The nozzle driving actuator 18b is connected to an ECU (Electronic Controlled Unit) 20 (e.g., a control device including a microcomputer), and the ECU 20 is connected to various sensors, such as a speed sensor 21 for detecting a vehicle speed, an accelerator position sensor 22 (an engine load detecting device) for detecting a load of the engine, a coolant temperature sensor 23 (an engine warming-up completion detecting unit) for detecting a coolant temperature of the engine, an engine speed sensor 24 for detecting an engine speed of the engine, and a shift lever position sensor 25 for detecting a position of a shift lever of a transmission for the engine. An exhaust brake switch 26 for turning an exhaust brake unit on or off is also connected to the ECU 20.

An idling state while the engine warm-up operation is operated is detected from an output of the coolant temperature sensor 23 and the engine speed sensor 24, more specifically, from a state where the coolant temperature is equal to or lower than a predetermined temperature (e.g., 82° C.) and the engine speed is equal to or lower than a predetermined number (e.g., 900 rpm). That is, the coolant temperature sensor 23 and the engine speed sensor 24 constitute an idling state detection unit for detecting the idling state while the engine warm-up operation is operated.

A normal map (shown in FIG. 2) used for a normal driving of an automobile in which the engine is mounted, i.e., a map for adjusting the opening degree of the variable nozzle 18 within a region equal to or larger than a predetermined opening degree for supercharging the engine in accordance with a driving condition of the automobile is stored in the ECU 20. Nozzle opening degrees of six levels sequentially increasing from, e.g., "3" to "8" as a region equal to or greater than a predetermined opening degree are set in this normal map, and the six nozzle opening degrees are in accordance with an operation condition of the engine, more specifically, the engine speed NE and the accelerator position θ. The NeO indicates the predetermined engine speed in the idling region, e.g., 900 rpm, and the θ0 indicates the accelerator position 0 also in the idling region.

A warming-up map (shown in FIG. 3) used for warming up the engine is also stored in the ECU 20. A nozzle opening degree having a region smaller than the above mentioned nozzle opening degree "3", i.e., the narrowest nozzle opening degree "1" as the nozzle opening degree suitable for the idling state is set in an idling region (meshed portion) surrounded by a horizontal line beginning from θ0 and a vertical line beginning from NeO in the warming-up map. That is, at the time of warming-up of the engine, the nozzle opening degree can be adjusted to the exclusive small nozzle opening degree "1" for quickening the warming-up which is different from the nozzle opening degrees "3" to "8".

Further, throttle opening degrees of the VG turbocharger 10 for performing an exhaust brake are also set in two portions (surrounded by dotted lines) in the normal map, in the two portions the accelerator position θ is "0" and the engine speed Ne is an intermediate engine speed region or a high engine speed region. More specifically, among the above mentioned two portions, one of them corresponding to the intermediate engine speed region is set as a nozzle opening "1" which is the narrowest opening degree of the variable nozzle 18a, and the other portion corresponding to the high engine speed region is set as a nozzle opening "2".

Further, the following functions are set in the ECU 20:

(1) a function to control the nozzle opening degree of the variable nozzle 18 in the region between the "3" and "8" in the normal map, when a state where an accelerator pedal is depressed to be moved from its initial position is detected (that is, the engine load is detected);

(2) a function to control the nozzle opening degree of the variable nozzle 18 at "1" of the warming-up map, when a non-engine load state where the accelerator pedal is positioned at its initial position (that is, the engine load is not detected) and the idling state where the engine speed is equal to or lower than the predetermined engine speed (e.g., 900 rpm or lower) are detected;

(3) a function to adjust the nozzle opening degree of the variable nozzle 18 from "1" to a value equal to or greater than a predetermined opening degree (more specifically, nozzle opening degree "3"), when the idling state having the engine speed equal to or lower than the predetermined engine speed (e.g., 900 rpm or lower) and the warming-up completion (i.e., when the engine coolant temperature exceeds a predetermined water temperature (e.g., 82° C.)) are detected;

(4) a function to detect whether the automobile is running or not on a basis of detection whether the transmission is set to neutral or not; and (5) a function (control function) to switch the nozzle opening degree of the variable nozzle 18 to "1" surrounded by the dotted line when the exhaust brake switch 26 is turned on and the engine speed is in the intermediate engine speed region while the accelerator pedal is turned off to be positioned at its initial position "0", and to switch the nozzle opening degree of the variable nozzle 18 to "2" surrounded by the dotted line when the exhaust brake switch 26 is turned on and the engine speed is in the high engine speed region while the accelerator pedal is turned off to be positioned at its initial position "0".

By these functions set in the ECU 20, both the supercharge operation mode suitable for the normal operation of the engine and the warming-up mode suitable for quickening the warming-up operation of the engine can be satisfied.

Figure 4:
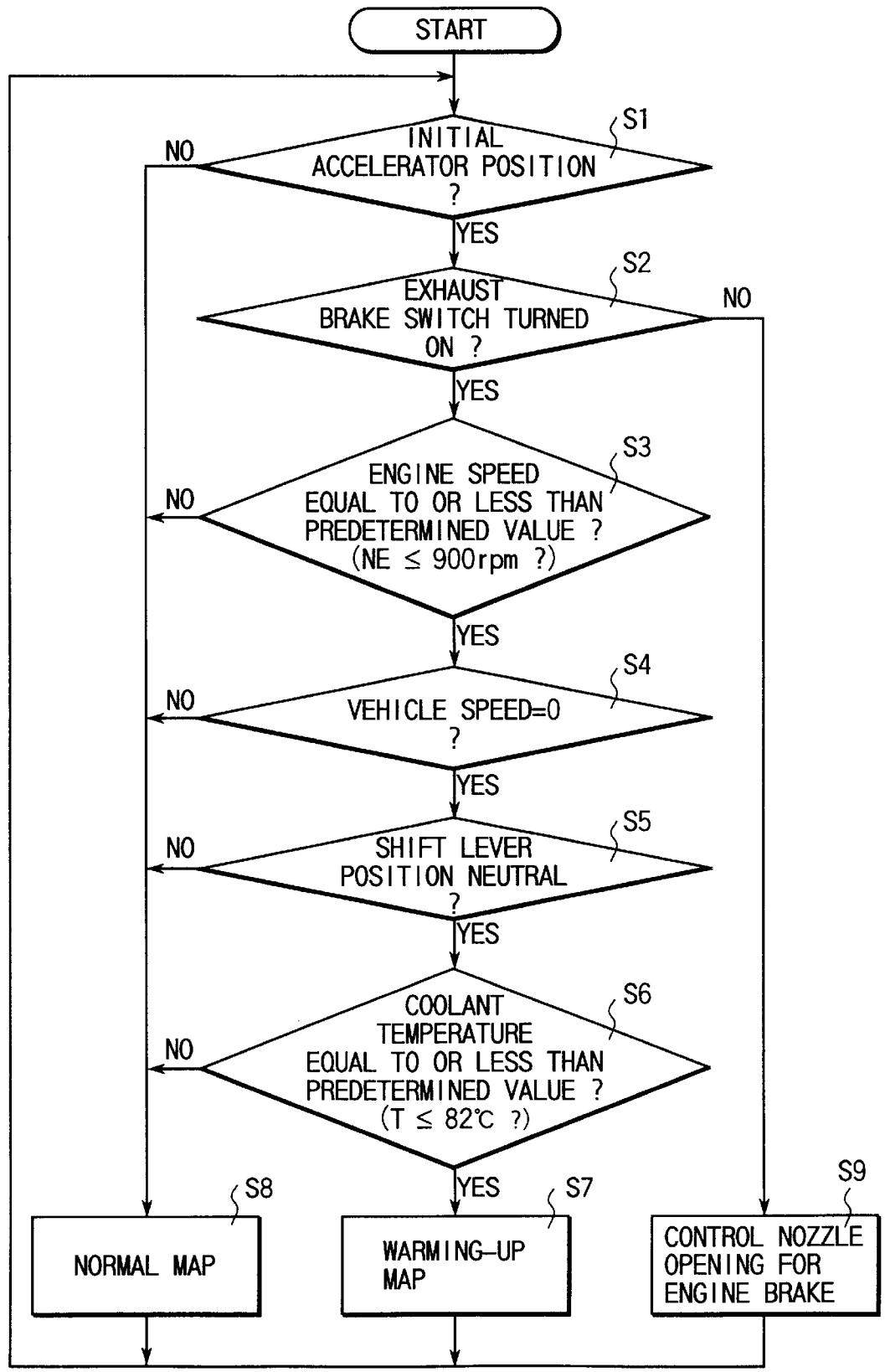
FIG. 4 is a flowchart for explaining the control of the apparatus shown in FIG. 1B.

A method for controlling a supercharger which satisfies both the modes is shown in a flowchart in FIG. 4.

A process of this flowchart starts when a diesel engine mounted in the automobile is started from its cold condition. The engine is started while a shift lever is in its neutral position.

The ECU 20 detects an engine condition from various signals output from the above mentioned various sensors.

More specifically, when the accelerator pedal is turned off to be positioned at its initial position "0" and the automobile is not running, that is the automobile is parked, the process in the flowchart is advanced from a step S1 to a step S3 through a step S2.

Here, the engine speed of the diesel engine is the predetermined value (NeO: 900 rpm) or less, i.e., idling engine speed, the automobile is parking and thus the vehicle speed is 0, and the shift lever of the transmission (T/M) is in its neutral position. Therefore, the process is advanced from the step S3 to a step S6 through steps S4 and S5.

In the step S6, since the engine is in the cold condition until the coolant temperature exceeds the predetermined value (82° C.), the ECU 20 judges that the diesel engine is in a non-loaded state and in the idling state before the engine warming-up is completed, and the process is advanced from the step S6 to a step S7.

In the step S7, the ECU 20 controls the variable nozzle 18 of the exhaust gas introducing port 13c in accordance with the warming-up map. More specifically, the ECU 20 drives the nozzle driving actuator 18b shown in FIG. 1B in accordance with the shaded portion of the warming-up map shown in FIG. 3 so as to throttle the variable nozzle 18 down to the exclusive opening degree suitable for the engine warming-up, i.e., the narrowest opening degree "1".

By the above operation, at the time of the warming-up of the diesel engine, the variable nozzle 18 of the exhaust turbine 13 is adjusted to the opening degree suitable for the engine warming-up, i.e., the narrowest opening degree "1", so that the exhaust gas resistance (the exhaust gas pressure) of the diesel engine is sufficiently increased to make the exhaust turbine 13 rotate at a relatively high level even with a small exhaust gas flow rate.

At that time, the increase of the exhaust gas resistance increases the engine load, and therefore an amount of an injected fuel from the fuel injection nozzle is increased to keep the idling engine speed constant.

The intake compressor 12 is driven at a high rotation due to a high rotation of the exhaust turbine 13, and an amount of intake air into the combustion chamber 4 of the cylinder 1 is increased.

Therefore, a heat generated by the engine is increased and thus the warming-up of the engine is quickened and the sufficient engine warming-up quickening effect can be obtained. A black smoke is not generated, of course.

Further, the variable nozzle 18 whose nozzle opening degree is adjusted to "1" secures a passage area 19 greater than that obtained when the butterfly valve of the exhaust brake apparatus is closed, and therefore, a noise generated by the exhaust gas when it passes through the variable nozzle 18 is extremely small.

During this engine warming-up operation, suppose that the shift lever is shifted from the neutral position to any of driving positions, the accelerator pedal is depressed to be moved from its initial position and the automobile starts its running.

Figure 2:
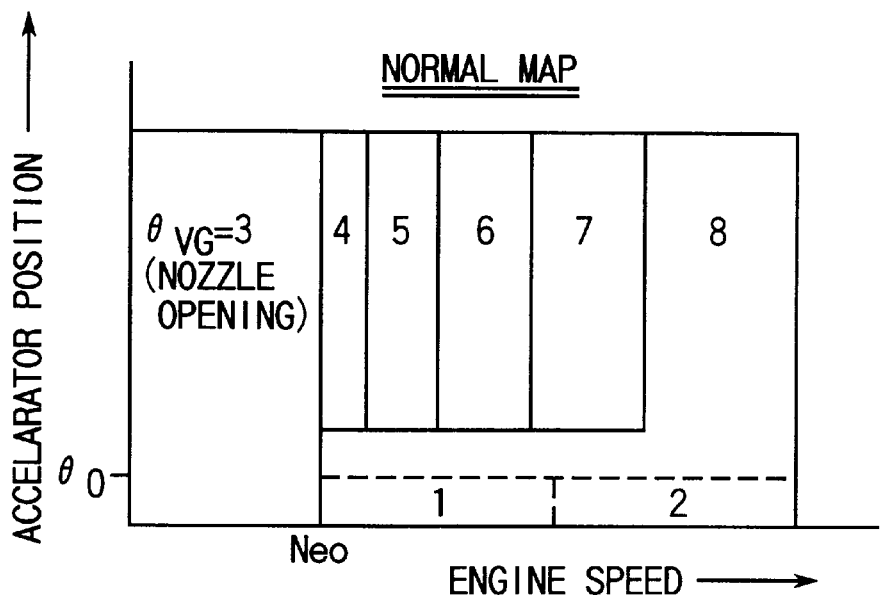
FIG. 2 shows a normal map for controlling a variable nozzle of an exhaust turbine in the apparatus shown in FIG. 1B when the engine is normally operating.
Figure 3:
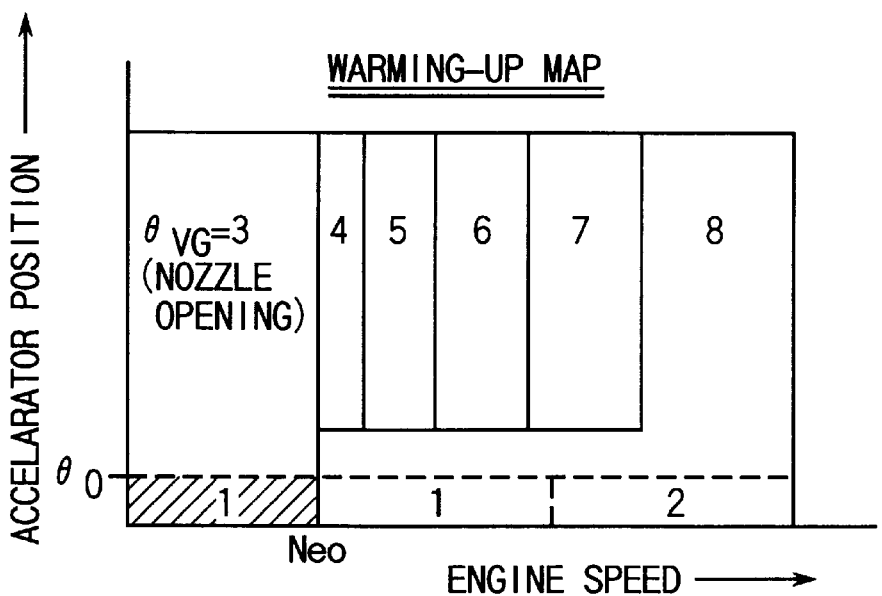
FIG. 3 shows a warming-up map for controlling the variable nozzle of the exhaust turbine in the apparatus shown in FIG. 1B when the engine is warmed up.

Then, the ECU 20 judges that the engine has been changed from the non-loaded state to a loaded state, the flowchart is advanced from the step S1 or S5 to a step S8, and the variable nozzle 18 becomes to be controlled by the normal map shown in FIG. 2, in place of the warm-up map shown by the shaded portion in FIG. 3.

That is, the variable nozzle 18 becomes to be adjusted by the nozzle opening degree suitable for the normal operation, i.e., the nozzle opening degrees of the six levels from "3" to "8" in accordance with the operation state of the automobile, thereby allowing the VG turbocharger 10 to appropriately supercharge the engine in accordance with the operation state.

Therefore, when the engine is brought into the loaded state, excessive rotation of the exhaust turbine 13 due to over throttling of the variable nozzle 18 should not be generated and thus, excessive intake air should not flow into the cylinder 1 of the engine.

When the automobile goes down a hill and the exhaust brake switch 26 is turned on, the ECU 20 judges that a braking force is required and the process is advanced from the step S2 to a step S9. The nozzle opening degree of the variable nozzle 18 is throttled to "1" or "2" in accordance with the engine speed of the automobile by the control of nozzle opening degree for the exhaust brake in step S9, and a braking force is generated by the increase in the exhaust gas pressure of the engine.

When the engine warming-up operation is advanced and the coolant temperature exceeds the predetermined value (e.g., 82° C.) based on which it is judged whether the engine warming-up operation has been completed or not while the idling state is kept (that is, the engine speed keeps a predetermined value (900 rpm) or less), the ECU 20 judges that the engine warming-up operation has been completed, and the process is advanced from the step S6 to the step S8 where the variable nozzle 18 becomes to be controlled by the normal map, in place of the warming-up map. The nozzle opening degree of the variable nozzle 18 is adjusted not for the engine warming-up but for the normal operation, i.e., by any of the six nozzle opening degrees "3" to "8".

Therefore, even if the flow rate of the exhaust gas is increased just after the engine warming-up operation has been completed and the automobile is started to run, the exhaust turbine 13 should not rotate excessively, and excessive air due to the excessive rotation of the exhaust turbine 13 should not flow into the combustion chamber 4 of the cylinder 1.

Because the supercharge operation mode suitable for the normal operation of the engine and the engine warming-up mode suitable for obtaining the engine warming-up quickening effect are selected, it is possible to obtain the sufficient engine warming-up quickening effect without deteriorating the supercharge operation mode. Further, when the flow rate of the exhaust gas is increased just after the engine warming-up operation has been completed and the automobile is started to run, the exhaust turbine 13 does not rotate excessively and thus, it is possible to prevent the fuel efficiency from being lowered.

The engine warm-up quickening effect is sufficiently effective also for an occupant in the truck. That is, when the occupant in the truck operates the engine in the idling state, operates the heater, and takes a nap, the engine is operated in the engine warming-up quickening state. Therefore, even if the open air temperature is extremely low, a sufficient heat generated by the engine is secured to maintain the coolant temperature equal to or higher than the predetermined value, so that a sufficient heating performance can be secured.

Although the above described embodiment is based on the diesel engine which is mounted in the truck, the present invention should not be limited to this particular case, and the invention may be applied to a diesel engine mounted in an other type of vehicle, or may be applied to an internal combustion engine other than a diesel engine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling a turbocharger having a variable nozzle, comprising:
    a step of detecting an idling state and a load state of an internal combustion engine; and
    a step of adjusting the opening angle of the variable nozzle to an angle equal to or greater than a predetermined opening angle when the load state of the engine is detected, and adjusting the opening angle of the variable nozzle to an angle smaller than the predetermined opening angle when the idling state and no-load state of the engine are detected, and
    wherein the detecting step includes detecting the position of an accelerator, engine speed, and coolant temperature, and
    further including the steps of:
    determining the idling state and the no-load state of the engine when the position of the accelerator is at an initial position, when the engine speed is equal to or less than a predetermined value, and when the coolant temperature is equal to or less than a predetermined value; and,
    determining the load state of the engine when the position of the accelerator is not at the initial position, the engine speed is larger than the predetermined value, and the coolant temperature is larger than the predetermine value.

2. A method according to claim 1, wherein the engine is mounted in a vehicle; and
    the detecting step includes detecting the position of a gear shift lever, and
    further including the steps of:
    determining the idling state and the no-load state of the engine when the position of the accelerator is at the initial position, the engine speed is equal to or less than a predetermined value, the vehicle speed is zero, the position of the gear shift lever is in neutral, and the coolant temperature is equal to or less than a predetermined value; and,
    determining the load state of the engine when the position of the accelerator is not at the initial position, the engine speed is larger than the predetermined value, the vehicle speed is not zero, the position of the gear shift lever is not in neutral, and the coolant temperature is larger than the predetermined value.

3. A method according to claim 2, wherein the detecting step further includes detecting an engine brake state; and,
    the adjusting step further includes adjusting the opening angle of the variable nozzle to an angle smaller than the predetermined opening angle when the engine brake state is detected.

4. A method according to claim 3, wherein the detecting step further includes detecting the position of an engine brake switch; and,
    determining the engine brake state when the position of the accelerator is at the initial position and an engine brake switch is turned on.

5. A method according to claim 1, wherein the detecting step further includes detecting an engine brake state, and,
    wherein the adjusting step further includes adjusting the opening angle of the variable nozzle to an angle smaller than the predetermined opening angle when the engine brake state is detected.

6. A method according to claim 5, wherein the detecting step further includes detecting a position of an engine brake switch; and,
    further including the step of determining the engine brake state when the position of the accelerator is at the initial position and an engine brake switch is turned on.

7. A turbocharger control apparatus, comprising:
    an exhaust turbine including an exhaust gas input port into which an exhaust gas is fed from an exhaust gas system of an internal combustion engine, the exhaust gas input port having a variable nozzle which can vary the passage size of the input port by adjusting its opening angle, the exhaust turbine being driven by the exhaust gas introduced through the input port with the variable nozzle;

an engine load detection device which detects a load on the internal combustion engine;

an idling state detecting device which detects the idling state when the engine warm-up operation is incomplete and the engine speed is equal to or less than a predetermined value;

an engine warm-up completion detection unit which detects the completion of an engine warm-up operation;

an engine speed sensor which senses engine speed; and a control device for adjusting the opening angle of the variable nozzle to an angle equal to or greater than a predetermined opening angle when the engine load detection device detects the load on the engine, and for adjusting the opening angle of the variable nozzle to an angle smaller than the predetermined opening angle when the engine load detection device detects a noload state of the engine and the idling state detection device detects an idling state of the engine; and, wherein the control device adjusts the opening angle of the variable nozzle equal to or greater than the predetermined opening angle when the engine speed is equal to or less than the predetermined value after engine warm-up is complete.

* * * * *